United States Patent [19]

Gunnarsson et al.

[11] Patent Number: 5,283,789
[45] Date of Patent: Feb. 1, 1994

[54] COMMUNICATION SYSTEM PROVIDING DATA AND TELEVISION SIGNALS TO PC WORK STATIONS

[75] Inventors: Gunnar Gunnarsson, Dumont, N.J.; Gregory A. Burch, Durham, N.H.

[73] Assignee: Private Satellite Network, Inc., New York, N.Y.

[21] Appl. No.: 884,487

[22] Filed: May 15, 1992

[51] Int. Cl.⁵ .................................................. H04J 1/00
[52] U.S. Cl. ......................................... 370/124; 370/123; 455/3.1; 348/6
[58] Field of Search ............... 370/123, 124, 76, 71, 370/72, 85.1; 358/86; 455/3.1, 5.1, 6.1, 6.2; 381/81

[56] References Cited

U.S. PATENT DOCUMENTS

| | | | |
|---|---|---|---|
| 4,077,006 | 2/1978 | Nicholson | 325/308 |
| 4,546,471 | 10/1985 | Bui-hai | 370/123 |
| 4,564,940 | 1/1986 | Yahata | 370/124 |
| 4,675,866 | 6/1987 | Takumi et al. | 370/124 |
| 4,764,922 | 8/1988 | Dieter et al. | 370/123 |
| 4,768,187 | 8/1988 | Marshall | 370/123 |
| 4,885,747 | 12/1989 | Foglia | 370/123 |
| 5,193,208 | 3/1993 | Yokata et al. | 370/124 |

Primary Examiner—Douglas W. Olms
Assistant Examiner—Dang Ton
Attorney, Agent, or Firm—Sprung Horn Kramer & Woods

[57] ABSTRACT

A communication system for transmitting relatively high frequency broadband electrical signals representative of broadband information and for transmitting relatively low frequency baseband electrical signals representative of baseband information. The system includes a length of communications media having at least one twisted pair of wires and a "multi-signal interface coupler" connected to one end of the communications media. The interface coupler has an RF signal port for passing the broadband signals in the unbalanced mode and a data signal port for passing the baseband signals. A circuit connected to the RF signal port and the data signal port, transmits both the broadband signals and the baseband signals in a balanced mode on the communications media.

51 Claims, 10 Drawing Sheets

COMMUNICATION SYSTEM PROVIDING DATA AND TELEVISION SIGNALS TO PC WORK STATIONS

BACKGROUND OF THE INVENTION

The present invention relates, generally, to a communication system for transmitting both data and television signals to and from one or more user work stations. More particularly, the invention relates to a communication system employing an industry standard local area network (LAN) or wide area network (WAN) to communicate on a broad spectrum of frequencies.

As used hereinafter, the term "backbone communication network" is intended to mean an electrical signal transmission facility which makes electrical signals available to a plurality of user work stations but which is not directly connected to any work station. The backbone network may form a part of a local area network (LAN) or wide area network (WAN).

The term "baseband signals" is intended to mean information signals within the frequency range of 0 to 100 MHz. Computer data is normally transmitted by baseband signals. The term "broadband signals" is intended to mean information signals at a frequency higher than the highest baseband frequency—typically in the frequency range of
100 to 500 MHz. If the upper limit of the baseband range terminates at 50 MHz, the lower limit of the broadband range can commence at this frequency. Video information (i.e., television) is normally transmitted by broadband signals.

A so-called "baseband network" is designed to transmit baseband signals, whereas a "broadband network" is designed to transmit broadband signals.

The term "balanced signal mode" or "balanced mode" is intended to mean a signal condition wherein the amplitudes of the signals applied on each of the wires of a "twisted pair" cable are oppositely poled relative to the cable shield or ground.

The term "unbalanced signal mode" or "unbalanced mode" is the signal condition wherein the applied signal amplitudes are likewise or similarly poled on each of the wires of a twisted pair cable relative to the cable shield or ground.

The term "equally unbalanced signal mode" or "equally unbalanced mode" is the signal mode wherein the signal amplitudes are likewise poled and of equal amplitude on each of the wires in the twisted pair cable relative to the cable shield or ground.

As so-called "multimedia" are incorporated into desktop computers (also known as "personal computers" or "PC's") and as "videoconferencing" is merged into user work stations which incorporate a PC, the increased system integration requires a substantial increase in the quantity of transmitted information as compared to the information conventionally transmitted on an industry standard local area network (LAN) or wide area network (WAN).

To this end, it is known to transmit both baseband and broadband signals on a common backbone network which, in turn, is connected to a plurality of user work stations by a distribution network. The U.S. Pat. No. 4,885,747 to Foglia discloses a so-called "filter coupler" or "F-coupler" by which the baseband signals are transmitted between a backbone network and a PC via a twisted pair shielded cable in a balanced mode and the broadband signals are transmitted between the same backbone network and the same PC via the same shielded cable in an unbalanced mode. The disclosure of this U.S. patent is incorporated herein by reference.

Among the drawbacks of the communication system disclosed in the U.S. Pat. No. 4,885,747 is the requirement that a specific type of twisted pair shielded cable must be used as the transmission line between a backbone network and each individual user work station. As specified by IBM Corp., this transmission line is so-called "type 9" wire. This requires, in some cases, recabling an entire floor or an entire building to accommodate this system.

SUMMARY OF THE INVENTION

It is a principal object of the present invention to provide a means of transmitting both a baseband signal and a broadband signal on the same transmission line to a user work station.

It is a further object of the present invention to provide a communication system which is capable of transmitting both baseband and broadband signals over an unshielded twisted pair wire, such as a high grade telephone line.

These objects as well as other objects which will become apparent from the discussion that follows, are achieved, in accordance with the present invention, by means of a circuit, hereinafter called a "multi-signal interface coupler", or more simply a "G-coupler", which transmits both the baseband signals and the broadband signals in a balanced mode along a length of communications media or transmission line.

In practice, a first interface coupler concentrates baseband and broadband signals into a length of shielded or unshielded "twisted pair wire". A second interface coupler, which can be identical to the first, separates the transmitted signals at the other end of the twisted pair into the original baseband signals and broadband signals.

In a preferred embodiment of the present invention, the interface coupler or "G-coupler" includes a "balun"—that is, a balanced signal/unbalanced signal transformer—connected in tandem with a bi-directional quarterwave stripline. The balun serves as the broadband input/output to differentiate and impedance match the broadband signals, applied in unbalanced mode via a 75 Ohm television cable to a 75 to 150 Ohm—nominally $100\Omega \pm 15\%$ —twisted pair transmission line in balanced mode.

An inductive network, formed of a pair of adjacent and parallel wires a quarter wavelength long, is connected between a "data signal port" and the twisted pair transmission line and serves as a low-pass network to prevent the broadband signals from passing to the data signal port. This quarter wavelength pair accomodates a wide range of impedances.

In addition, a capacitive network, formed of a single one-eighth wavelength long wire arranged adjacent to and parallel with the quarter wavelength pair of wires, serves as a high-pass network, coupling the broadband signals into the twisted pair transmission line. This combination of wires causes the interface coupling to act directionally for the broadband signals and still act bi-directionally for the baseband signals.

An additional capacitive network is provided at the data signal port to shunt away any broadband signals that might be left after passing through the low-pass filter, and to improve the directional characteristic of the circuit, by shunting all the high frequency signals to ground.

The preferred embodiments of the present invention will now be described with reference to the accompanying drawings.

DESCRIPTION OF THE PREFERRED EMBODIMENTS

The preferred embodiments of the present invention will now be described with reference to FIGS. 1-13 of the drawings. Identical elements in the various figures are identified with the same reference numerals.

Figure 1:
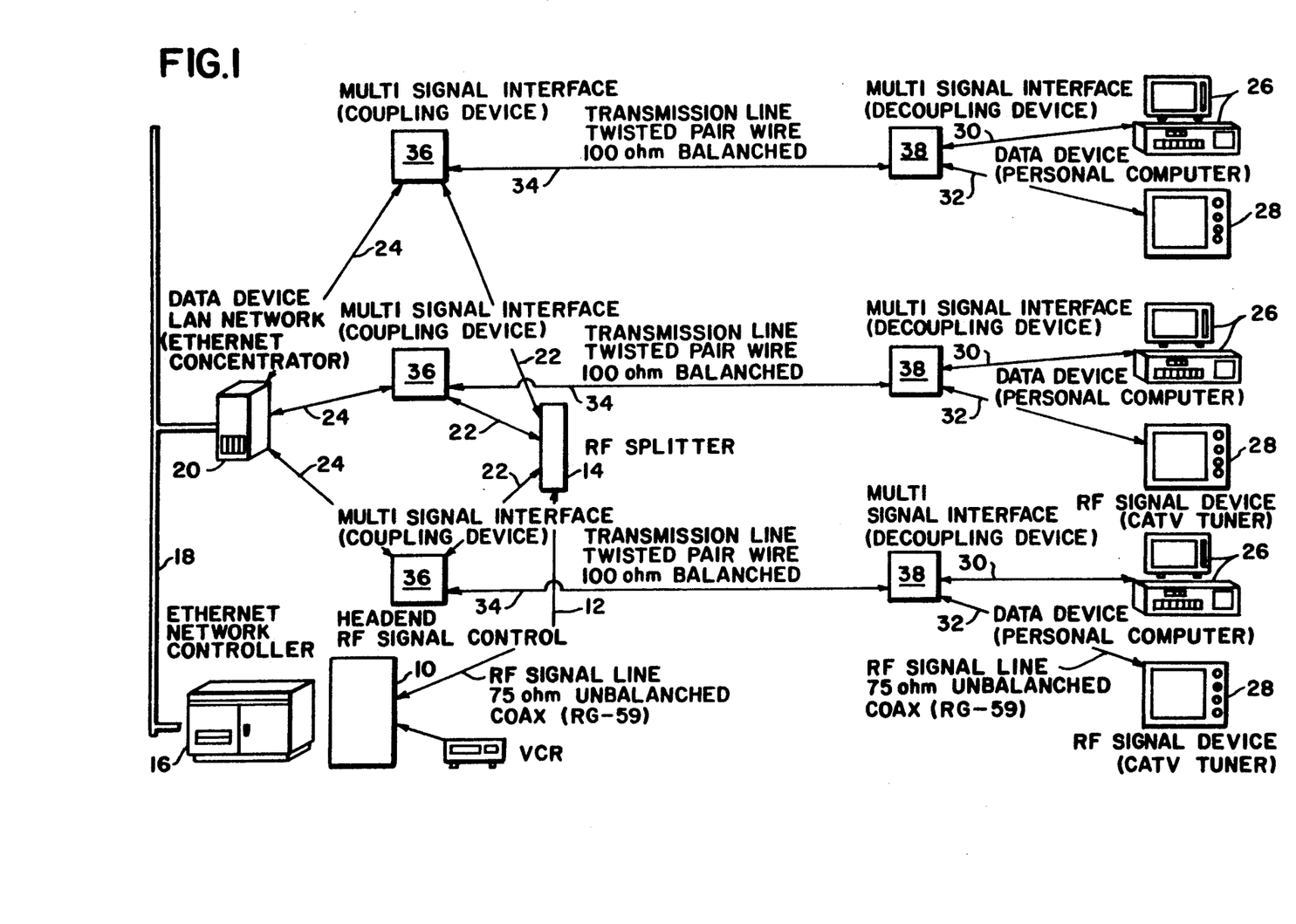
FIG. 1 is a block diagram of a communication system of the type to which the present invention relates.

FIG. 1 shows a communication system having a so-called "backbone" communication network that comprises a first subassembly network, including a headend RF signal control unit 10, a 75 Ohm unbalanced coax (RG-59) cable 12 and an RF splitter 14 for presenting the broadband (video) signals in an unbalanced mode to a plurality of users. The backbone network also includes a second subassembly network for baseband (data) signals including an Ethernet network controller 16, an Ethernet coax or optical fiber cable 18 and an Ethernet concentrator 20.

The RF signal control 10 receives television programming from a CATV cable, a VCR, a video camera or some other source and, after selecting a particular program, supplies this program to all the users of the network via the cable 12 and RF splitter 14.

Similarly, the Ethernet network receives data from either a common source, such as a file server, or from one or more users of the network, and supplies this data at baseband frequencies to the various user work stations through the Ethernet concentrator 20.

In the embodiment shown in FIG. 1, the transmission is indicated as being bi-directional; that is, from the backbone communication network to the user work stations and vice versa. One-way or uni-directional communication is also contemplated for this invention as will be described in connection with FIGS. 10A and 10B.

The communication system of FIG. 1 also comprises a "distribution communication network" which simultaneously transmits the broadband signals via coax (RG-59) cables 22 and baseband signals via twisted pair wires 24, connected between the first and second subassembly networks, respectively, and a plurality of user work stations. As shown, these work stations include a data processing device, such as a personal computer 26, and an RF signal processing device such as a CATV tuner and monitor 28.

The data processing device receives baseband signals via a twisted pair wire 30. These baseband signals may, for example, be in the order of 10 MHz. The RF signal processing device 28 receives broadband signals on a 75 Ohm unbalanced coax (RG-59) cable 32. These broadband signals may have frequencies in the order of, for example, 200-350 MHz.

The distribution communication network supplying both baseband and broadband signals to the user work station further includes a plurality of transmission lines 34. These lines may comprise a high grade telephone line; that is, an unshielded twisted pair wire such as the "Systemax" wire from AT&T. In the preferred embodiment of the present invention, this wire has an impedance of nominally 100 Ohms and transmits both the baseband signals and broadband signals in the balanced mode.

On opposite ends of the twisted pair are provided identical multi-signal interface couplers 36 and 38. These couplers, which will be described in detail hereinafter, are also called "G-couplers".

The interface couplers 36 at the backbone network end receive the broadband signals in unbalanced mode via the coax cables 22 and the baseband signals in balanced mode via the twisted pair wires 24. The interface couplers convert the unbalanced broadband signal to a balanced broadband signal, exercising their directivity to transmit the broadband signal on the respective transmission line 34. The interface couplers 36 also act passively to couple the baseband signals to the transmission line 34 while having substantially no effect on these baseband signals.

At the opposite end, the interface couplers 38 operate in reverse to present the broadband signals in unbalanced mode to the coax cables 32 and present the baseband signals in balanced mode to the twisted pair wires 30.

Figure 2:
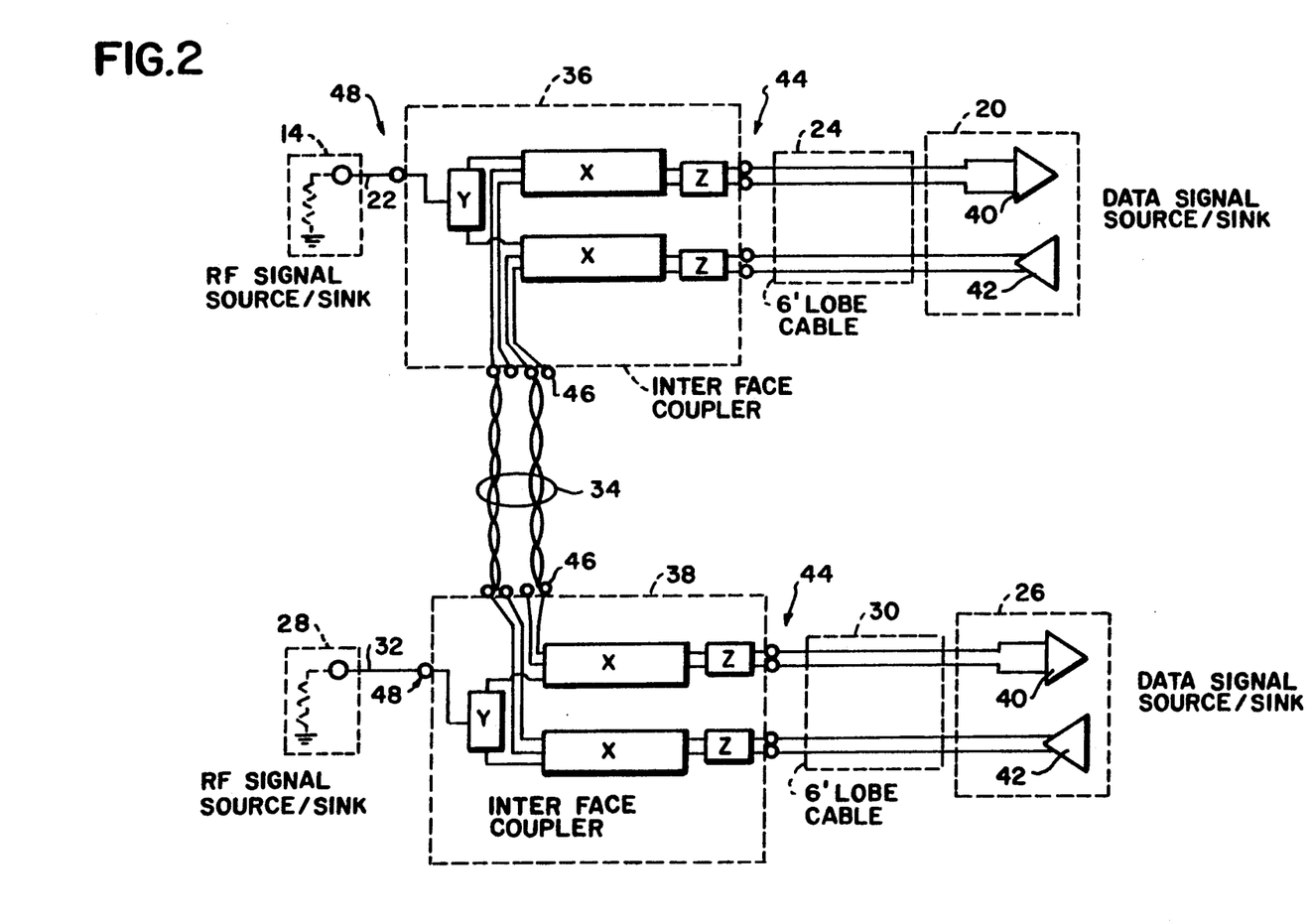
FIG. 2 is a block diagram of two multi-signal interface couplers according to the present invention disposed at opposite ends of two "twisted pair" transmission lines and adapted for two-way communication.

FIG. 2 is a schematic diagram showing the multi-signal interface coupling devices 36 and 38 in greater detail. These "G-couplers" provide for two-way communication between the backbone network comprising the RF signal source 14 and the Ethernet concentrator 20, on one hand, and a user work station comprising a data device 26 (e.g., a personal computer) and an RF signal device 28 (such as a CATV tuner) on the other. Both the Ethernet concentrator and the data device 26 are provided with amplifiers 40 and 42, which may be integrated chip sets, connected to receive and transmit balanced signals on the "lobe cables" 24 and 30. Similarly, two-way broadband communication is provided between the RF splitter 14 and the user work station 28 by presenting or receiving, respectively, an RF signal in unbalanced mode on the coax cables 22 and 32.

FIG. 2 shows two signal paths within the multi-signal interface couplers 36 and 38. A first path is the baseband signal path between a "data signal port" 44 through an "RF choke" portion Z to a "transmission line port" 46. Here the objective is to have this signal pass through the coupler as unobstructed as possible, without it "seeing" any of the RF components at all.

The second signal path is for the broadband (RF) signals which are injected or received at an RF signal port 48 of the coupler. A "balun" Y converts between a 75 Ohm unbalanced signal to a nominally 100 Ohm balanced signal. The broadband signal is then passed through a high-pass capacitive network X to the transmission line port 46.

Two ordinary twisted pair wires 34 couple the transmission line port of one coupler 36 to that of the other coupler 38.

Figure 3:
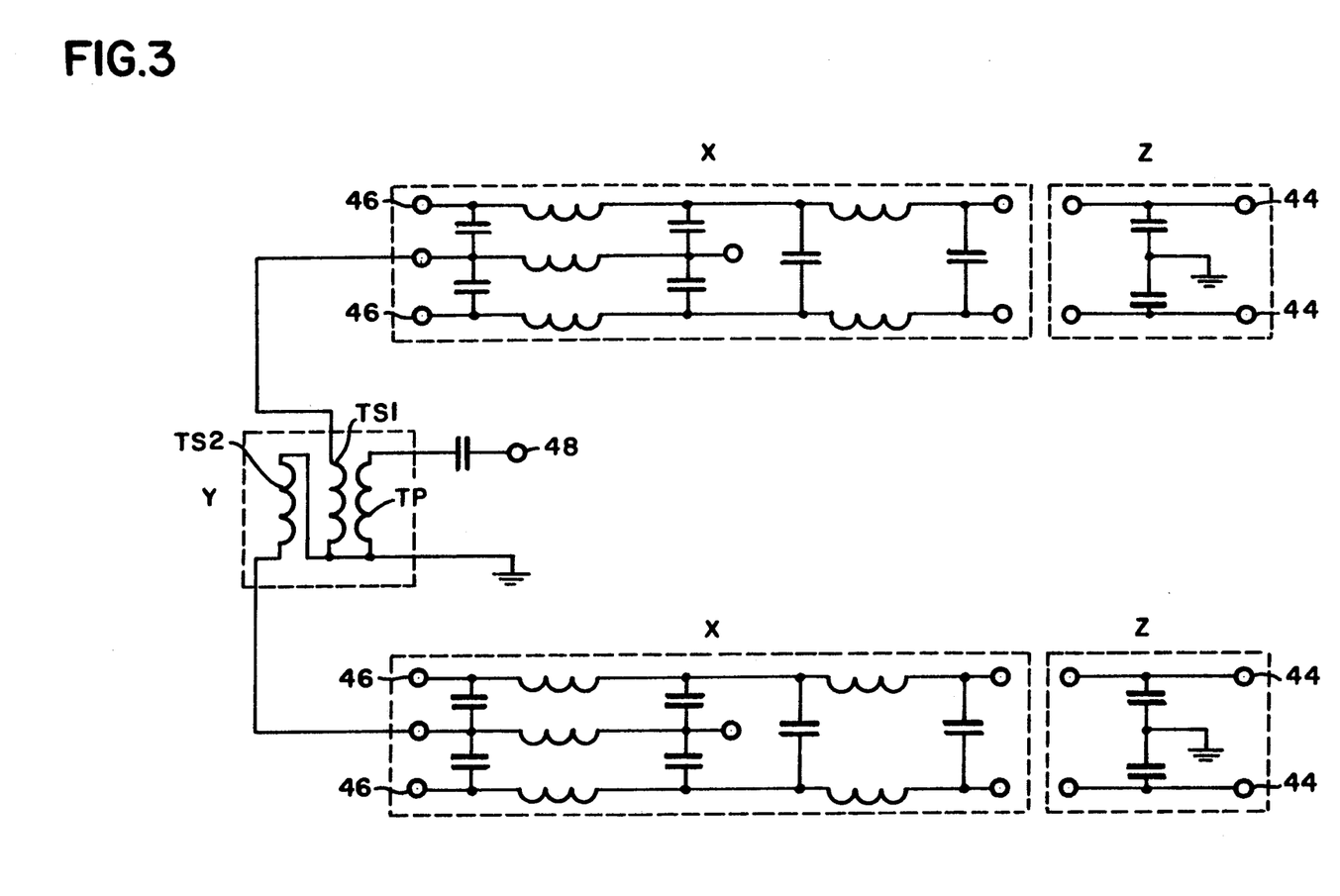
FIG. 3 is a schematic diagram of a multi-signal interface coupler illustrating the contents of the blocks X, Y and Z in FIG. 2.

FIG. 3 illustrates schematically the contents of the blocks X, Y and Z in the interface couplers 36 and 38 of FIG. 2. The individual terminals for the respective data signal port 44, transmission line port 46 and RF signal port 48 have been indicated with appropriate reference numerals.

The circuit of block X serves to provide inductive (low-pass) coupling for the baseband signals from the data signal port 44 to the transmission line port 46. The block X also provides capacitive (high-pass) coupling for the broadband signals between the balun Y and the transmission line 46. This circuit acts bi-directionally for the baseband signals and directionally (from balun to transmission line or vice versa) for the broadband signals.

The balun Y has a 1:1 winding ratio between the primary winding TP and the secondary windings TS1 and TS2.

Finally, the block Z provides high-pass coupling to ground to shunt away any broadband signals that might be left after passing through the low-pass filter. The circuit Z also improves the directionality of the broadband signals by shunting the portion of these signals which can reach the data signal port to ground.

Figure 4:
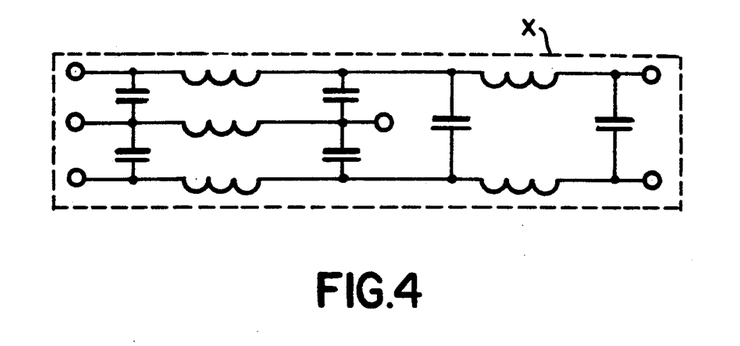
FIG. 4 is a schematic diagram of the circuit of block X in FIG. 3.
Figure 5:
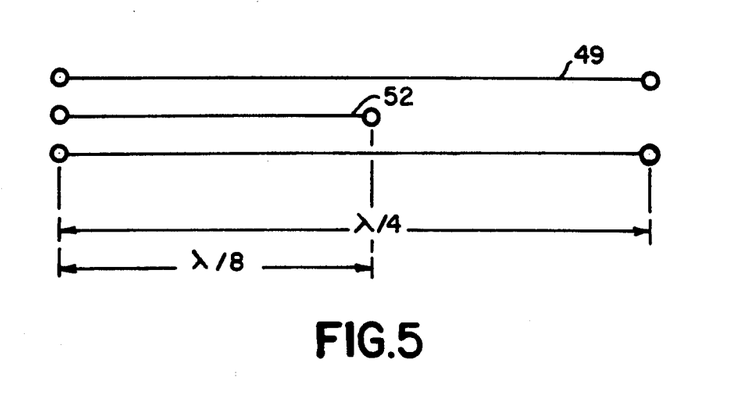
FIG. 5 is a diagram showing the preferred implementation of the circuit of FIG. 4.

FIG. 5 shows the preferred implementation of the high-pass/low-pass coupling circuit of block X. For comparison, this circuit x is also reproduced immediately above FIG. 5 as FIG. 4. FIG. 5 shows two wires 49 and 51 arranged in parallel with a third, shorter wire 52. The Wires 49 and 51 have a length $\lambda/4$ and the wire 52 has a length of $\lambda/8$, where $\lambda$ is the wavelength of propogation in the frequency range of the broadband signals. Typically, $\lambda$ may be approximately 100 centimeters which is the wavelength at 300 MHz. The wires 49 and 51 are therefore 25 centimeters, and the wire 52 is 12.5 centimeters in length.

Figure 6:
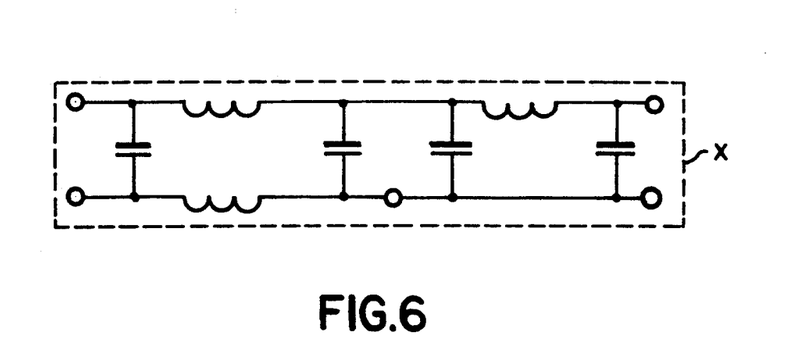
FIG. 6 is a schematic diagram showing a uni-directional version of the circuit of block X.
Figure 7:
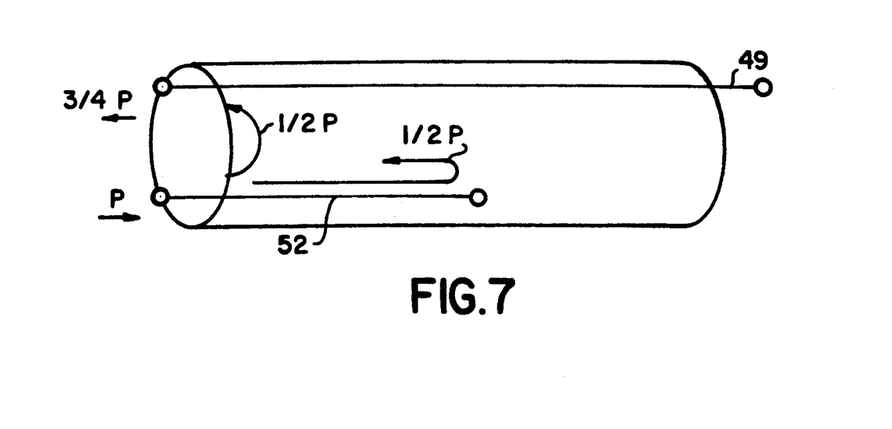
FIG. 7 is a representational diagram illustrating the operation of the circuit of FIG. 6.

FIG. 7 illustrates the operation of the high-pass/low-pass coupler of FIGS. 4 and 5. For simplicity, FIG. 7 is a one section coupler as illustrated in FIG. 6. Due to the inherent capacitive coupling between the wires 49 and 52, an RF signal of power P applied to one end of the wire 52 will divide into one half P which is passed to the wire 49 and one-half P which is transmitted down the wire 52. Since the wire 52 is not terminated, the signal one-half P will be reflected back and one-half of this signal—that is, one-fourth P—will be coupled into the wire 49. Consequently, three-fourths P will appear at the output of the wire 49.

The spool is "transparent" as possible to electric and magnetic fields.

Whereas the balun is formed of sufficiently heavy gauge wire as to not require a physical support, the wire forming the quarter wavelength strip line X is preferably relatively thin and would therefore lose its form and shape if not wound on a spool. The principal reason for winding the quarter wavelength strip line into a coil is to reduce the real estate required for this circuit element.

Figure 8:
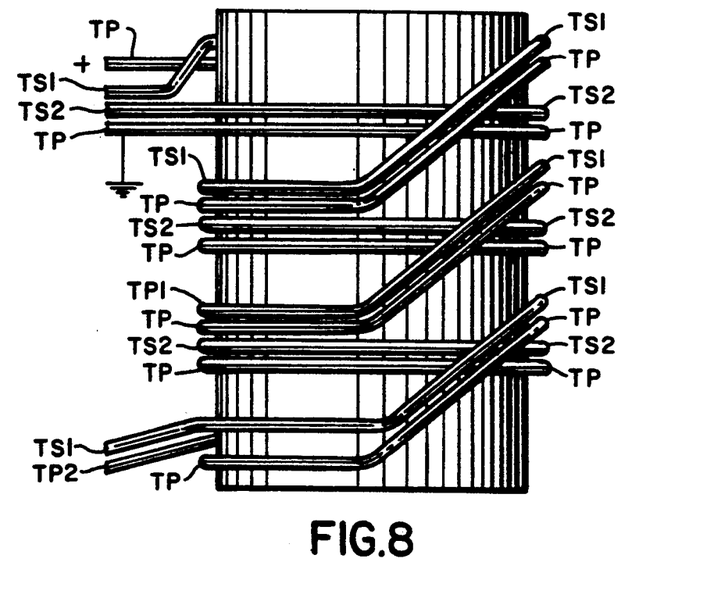
FIG. 8 is an elevational view of a balun transformer, indicated as block Y in FIG. 3.
Figures 9, 9A, 9B:
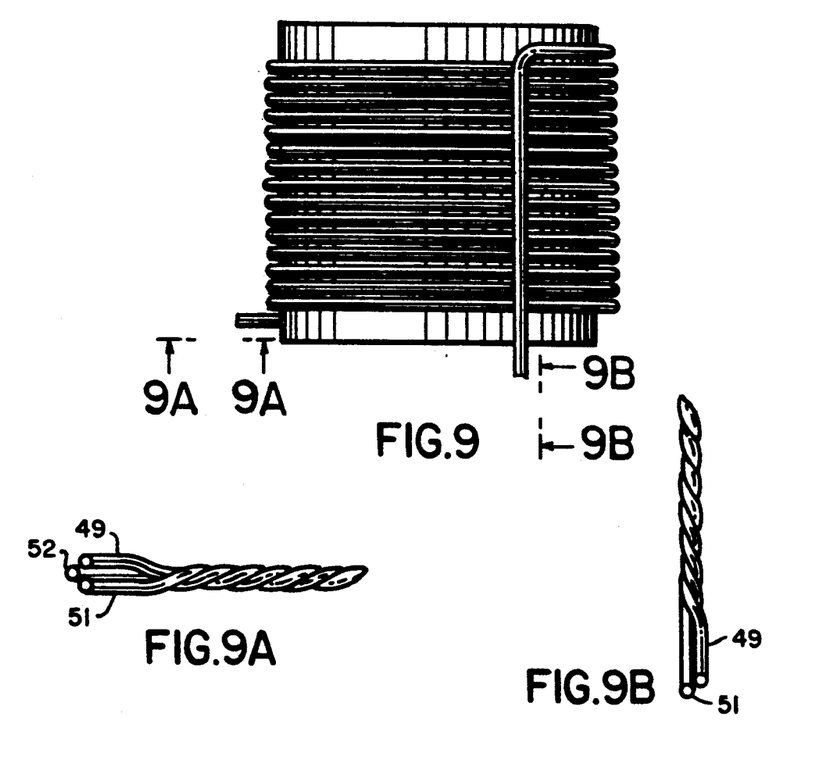
FIGS. 9A and 9B are an elevational view of the high- and low-pass coupling circuit indicated as block X in FIG. 3.

FIGS. 8 and 9 illustrate how the balun Y and the coupling wires of the high-pass/low-pass coupler X may be wound on a spool for maximum coupling and minimum space. Preferably, these wires are wound together around a spool which is made of plastic or other electrically insulative and non-magnetically permeable material, such as Teflon.

As shown in FIG. 8, the primary winding TP of the balun is wound clockwise from the RF signal port 46 at one end of the spool to the opposite end of the spool, and then wound counter-clockwise back to the initial starting point, where it is grounded. The two secondary windings TS1 and TS2 are wound clockwise and counter-clockwise, respectively, from one end of the spool to the other.

As FIGS. 9, 9A and 9B show, the three wires 49, 51 and 52 are wound counter-clockwise around the spool. Since the wire 52 terminates half-way to the end, only the wires 49 and 51 emerge from the other end of the spool.

Figure 10A:
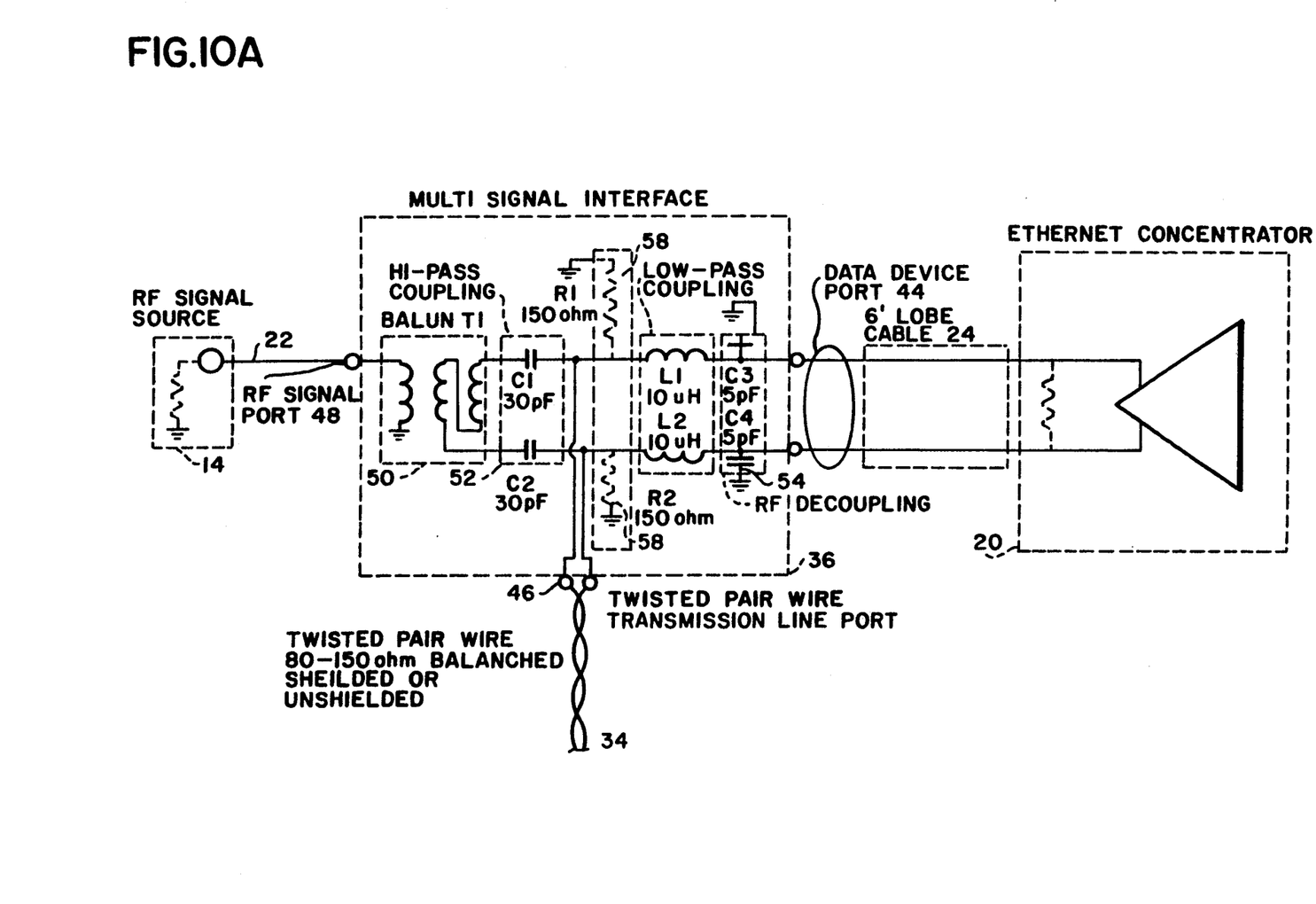
FIGS. 10A and 10B are a schematic diagram of two multi-signal interface couplers according to the present invention disposed at opposite ends of one "twisted pair" transmission line and adapted for one-way communication.
Figure 10B:
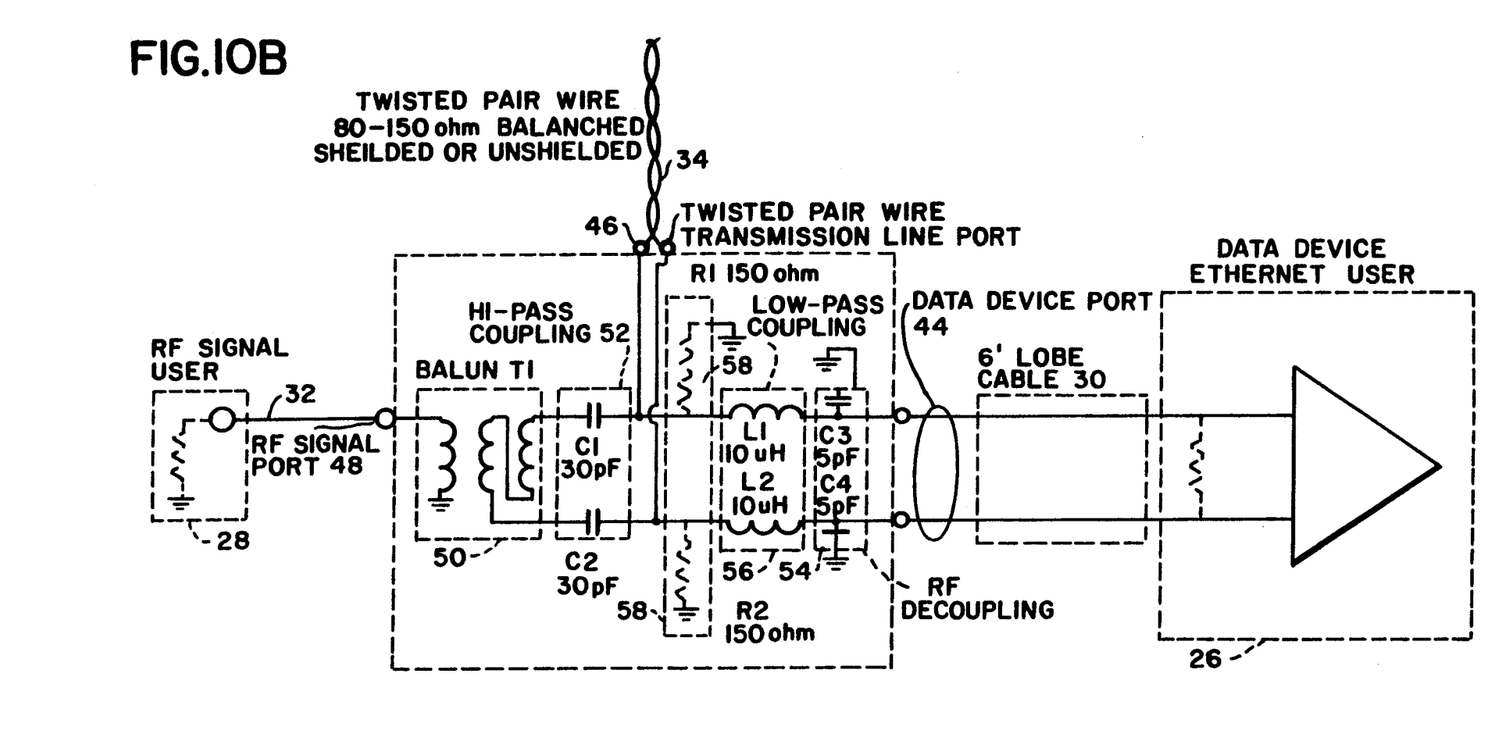
Figure 11:
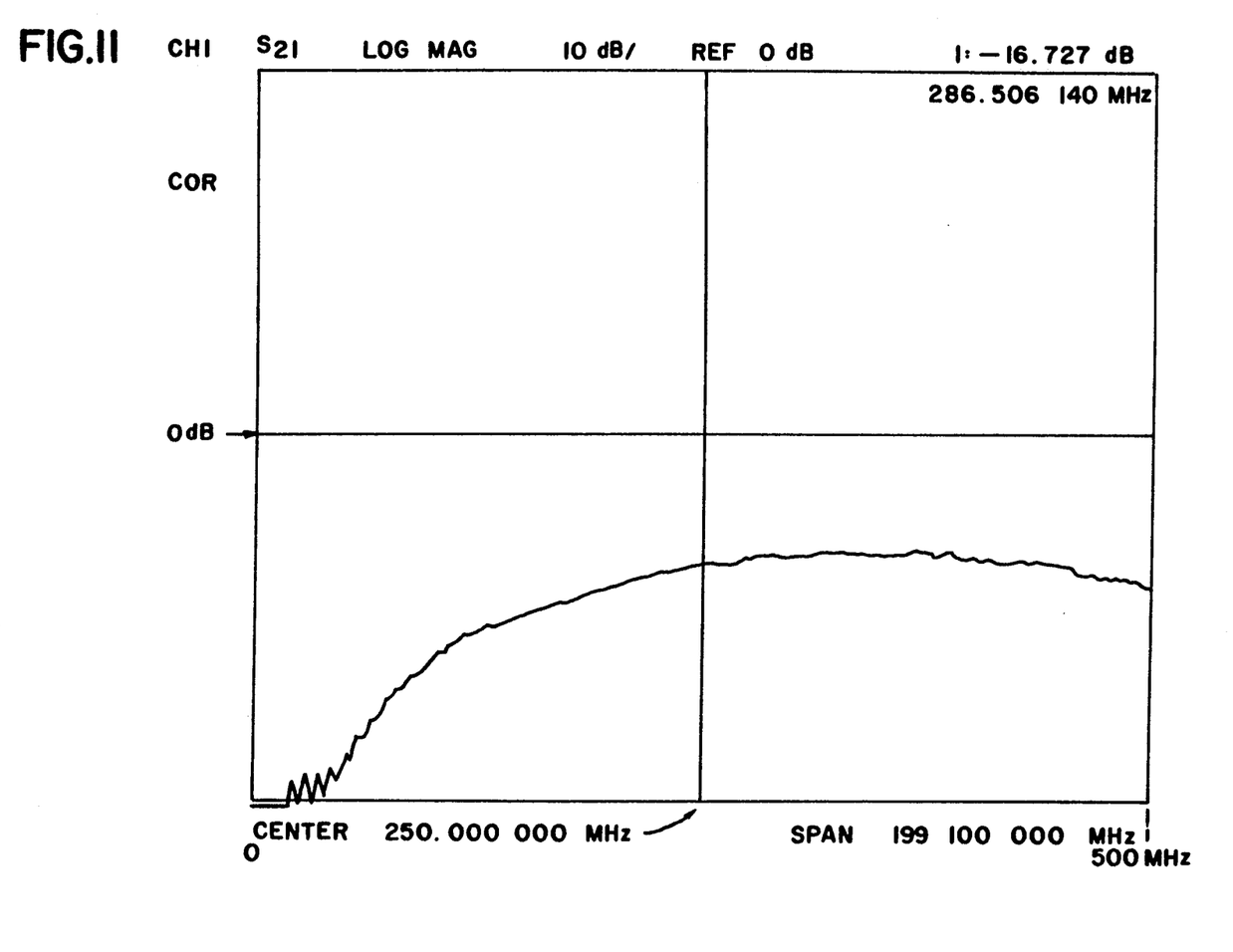
FIG. 11 is a graph of the frequency response of the so-called "F-coupler" disclosed in the U.S. Pat. No. 4,885,747, connected to 100 feet of shielded twisted pair wire (IBM cabling system type 9 cable).

FIGS. 10A and 10B schematically illustrate the multi-signal interface couplers 36 and 38. In this case, these couplers are designed for uni-directional communication: from the backbone network to the user work station. However, these couplers 36 and 38 operate in exactly the same manner as the couplers shown in FIGS. 2 and 3.

As shown in FIGS. 10A and 10B, the interface couplers comprise a high-pass coupling network 52, an RF choke (filter) decoupling network 54 and a low-pass coupling network 56. The high-pass coupling network 52 serves to isolate the RF signal source or signal sink from the baseband signals; the RF choke or decoupling network 54 serves to isolate the data device port and the baseband signals from the broadband signals.

Finally, line termination and impedance matching is effected by a resistance network 58 connecting the balanced wires of each coupler to ground.

As mentioned above, the U.S. Pat. No. 4,885,747 discloses an alternative coupling device or "F-coupler" in which the baseband signals are transmitted in a balance mode, and the broadband signals are transmitted in an unbalanced mode, on a special type (type "9") of shielded twisted pair cable. The frequency response of this F-coupler, connected to 100 feet of type A wire, has been analyzed in a network analyzer from 0 to 500 MHz. This frequency response is set forth in graphic form in FIG. 11.

Figure 12:
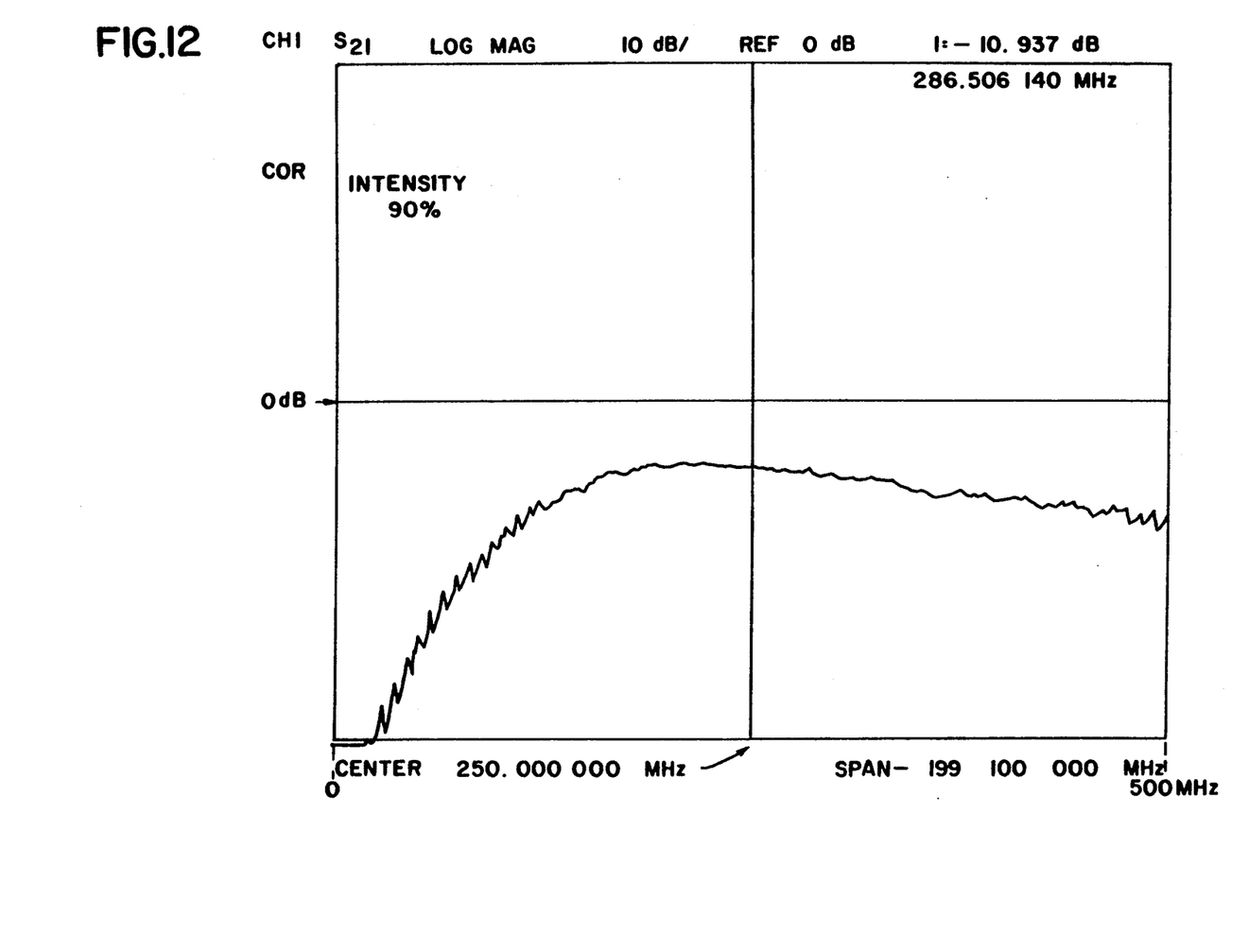
FIG. 12 is a graph of the frequency response of the multi-signal interface coupler or "G-coupler" according to the present invention, connected to 100 feet of shielded twisted pair wire (type 9 cable).
Figure 13:
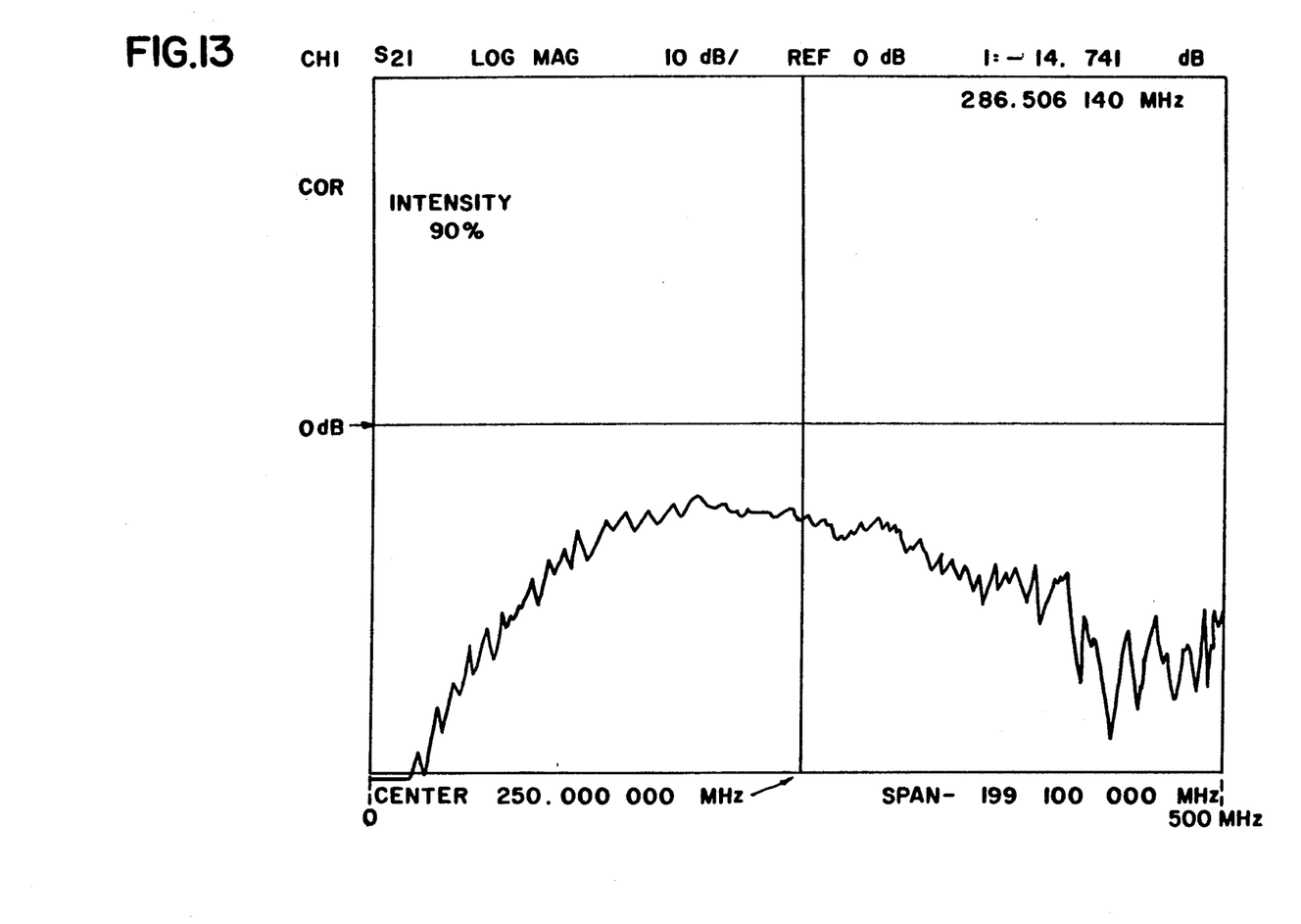
FIG. 13 is a graph of the frequency response of the multi-signal interface coupler or "G-coupler" according to the present invention, connected to 100 feet of unshielded, high grade twisted pair telephone wire (Systemax wire from AT&T).

In comparison, the frequency response of the multi-signal interface coupler or "G-coupler" according to the present invention, also connected to 100 feet of type A wire, has been analyzed and the results are set forth in graphic form in FIG. 12. As may be seen, this response is somewhat improved in the baseband range, but tapers off slightly in the broadband range.

By transmitting both the baseband and broadband signals in a balanced mode, the communication system according to the present invention can make use of high grade unshielded twisted pair, telephone wire. When analyzed on the same network analyzer that produced FIGS. 11 and 12, the G-coupler connected to 100 feet of Systemax high grade telephone wire exhibited the frequency response shown graphically in FIG. 13. Although this frequency response tapers off and is somewhat erratic in the frequency range above 300 MHz, the transmission capability of the unshielded twisted pair is fully adequate to transmit the broadband signals.

To summarize, the multi-signal interface coupler or "G-coupler" according to present invention comprises three circuit blocks X, Y and Z. The circuit block X consists of a quarter wavelength strip line which connects both the data signal port and circuit block Y with the transmission line port. This circuit block X has essentially four functions:

(1) To couple baseband signals from the data signal port to the transmission line port;
(2) To couple broadband signals from the circuit block Y to the transmission line port;
(3) To inhibit broadband signals from being transmitted to the data signal port; and
(4) To inhibit baseband signals from being transmitted to the circuit block Y.

The circuit block Y, which is a balun, converts an unbalanced broadband signal to a balanced broadband signal. Preferably, the balun winding ratio is 1:1 to avoid a change in signal level.

The circuit block Z, which connects the data signal port to the circuit block X, also serves essentially four functions:

(1) To shunt broadband signals to ground that would otherwise reach the data signal port;
(2) To shunt any RF to ground that is induced into the external wires connected to the data signal port;
(3) To provide impedance matching to the circuit block X; and
(4) To provide further impedance matching where needed, by adding a resistance to ground.

There has thus been shown and described a novel communication system providing data and television signals to PC work stations which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

We claim:

1. A communication system for transmitting and receiving both broadband and baseband electrical signals representative of broadband and baseband information, respectively, said system comprising, in combination:
(a) a backbone communication network including:
(1) a first subassembly network for presenting said broadband signals in an unbalanced mode; and
(2) a second subassembly network for presenting said baseband signals;
(b) a distribution communication network for simultaneously transmitting said broadband signals and said baseband signals to at least one user work station via a twisted pair wire; and
(c) circuit means, coupling said first and second subassembly networks with said distribution communication network, for converting the unbalanced broadband signals received from said first subassembly network to balanced broadband signals and transmitting said balanced broadband signals on said twisted pair wire, and for transmitting said baseband signals received from said second subassembly network on said twisted pair wire.

2. The communication system defined in claim 1, wherein said circuit means pass said baseband signals from said second subassembly network to said twisted pair wire while having substantially no effect thereon.

3. The communication system defined in claim 2, wherein said second subassembly network presents said baseband signals in a balanced mode and said baseband signals are transmitted on said twisted pair wire in a balanced mode.

4. The communication system defined in claim 1, wherein said distribution communication network transmits said broadband signals and said baseband signals to a plurality of user work stations via a plurality of twisted pair wires.

5. The communication system defined in claim 4, further comprising RF splitter means, associated with said first subassembly, for partitioning and distributing said broadband signals to said distribution communication network.

6. The communication system defined in claim 1, wherein said distribution communication network is further operative to receive said broadband signals and said baseband signals from said at least one work station, and wherein said circuit means is bi-directional and is operative to transmit said broadband signals and said baseband signals in either direction.

7. The communication system defined in claim 1, wherein said circuit means includes an RF signal port coupled to said first subassembly network and a balun transformer connected to said RF signal port for converting said broadband signals from an unbalanced mode to a balanced mode.

8. The communication system defined in claim 6, wherein said circuit means includes an RF signal port coupled to said first subassembly network and a balun transformer connected to said RF signal port for converting said broadband signals between unbalanced mode and a balanced mode.

9. The communication system defined in claim 7, wherein said balun transformer includes at least two windings, wound on a spool which is electrically and magnetically transparent.

10. The communication system defined in claim 8, wherein said balun transformer includes at least two windings, wound on a spool which is electrically and magnetically transparent.

11. The communication system defined in claim 9, wherein said spool is made of plastic.

12. The communication system defined in claim 10, wherein said spool is made of plastic.

13. The communication system defined in claim 7, wherein said circuit means further include high-pass coupling means, connected between said balun transformer and said twisted pair wire, for passing said broadband signals to said wire and inhibiting the transmission of said baseband signals to said balun transformer.

14. The communication system defined in claim 8, wherein said distribution network comprises two twisted pair wires between said backbone communication network and each user work station for bi-directional transmission, wherein said circuit means further include high-pass coupling means, connected between said balun transformer and each of said twisted pair wires, for passing said broadband signals between said wires and said balun transformer and inhibiting the transmission of said baseband signals to said balun transformer.

15. The communication system defined in claim 13, wherein said circuit means further include a data signal port coupled to said second assembly network and low-pass coupling means, connected between said data signal port and said twisted pair wire, for passing said baseband signals and inhibiting the transmission of broadband signals to said data signal port.

16. The communication system defined in claim 14, wherein said circuit means further include a data signal port coupled to said second assembly network and low-pass coupling means, connected between said data signal port and said two twisted pair wires, for passing said baseband signals and inhibiting the transmission of said broadband signals to said data signal port.

17. The communication system defined in claim 15, wherein said low-pass coupling means comprise a pair of first wires arranged in parallel and connected between said data signal port and said twisted pair wire, and wherein said high-pass coupling means include at least one second wire arranged in parallel with said first wires and connected at one end to said balun transformer.

18. The communication system defined in claim 16, wherein said low-pass coupling means comprise two pair of first wires arranged in parallel and connected between said data signal port and a respective set of said twisted pair wires, and wherein said high-pass coupling means include at least one second wire arranged in parallel with each pair of said first wires and connected at one end to said balun transformer.

19. The communication system defined in claim 17, wherein said pair of first wires are substantially $\lambda/4$ in length and said second wire is substantially $\lambda/8$ in length, where $\lambda$ is the wavelength of propogation at a frequency of said broadband signals, said first and said second wires having a common point of termination at one end.

20. The communication system defined in claim 18, wherein said two pair of first wires are substantially $\lambda/4$ in length and said second wires are substantially $\lambda/8$ in length, where $\lambda$ is the wavelength of propogation at a frequency of said broadband signals, each of said pair of first wires and the respective, associated one of said second wires having a common point of termination at one end.

21. The communication system defined in claim 19, wherein said first and second wires are wound together on a spool which is electrically and magnetically transparent.

22. The communication system defined in claim 20, wherein each pair of said first wires and their respective, associated second wires are wound together on a spool which is electrically and magnetically transparent.

23. The communication system defined in claim 21, wherein said spool is made of plastic.

24. The communication system defined in claim 22, wherein said spool is made of plastic.

25. A communication system for transmitting relatively high frequency broadband electrical signals representative of broadband information and for transmitting relatively low frequency baseband electrical signals representative of baseband information, said system comprising, in combination:

(a) a length of communications media having at least one twisted pair of wires; and (b) a first multi-signal interface coupler connected to one end of said communications media, said interface coupler including an RF signal port for passing said broadband signals in unbalanced mode, a data signal port for passing said baseband signals and circuit means, connected to said RF signal port and said data signal port, for transmitting both said broadband signals and said baseband signals in a balanced mode on said length of communications media.

26. The communication system defined in claim 25, wherein said circuit means pass said baseband signals from said data signal port to said communications media while having substantially no effect thereon.

27. The communication system defined in claim 26, wherein said baseband signals are presented to said data signal port in a balanced mode.

28. The communication system defined in claim 25, further comprising a second multi-signal interface coupler, identical to said first interface coupler, connected to the opposite end of said communications media.

29. The communication system defined in claim 25, wherein said circuit means includes balun transformer connected to said RF signal port for converting said broadband signals from an unbalanced mode to a balanced mode.

30. The communication system defined in claim 29, wherein said balun transformer includes at least two windings, wound on a spool which is electrically and magnetically transparent.

31. The communication system defined in claim 30, wherein said spool is made of plastic.

32. The communication system defined in claim 29, wherein said circuit means further includes high-pass coupling means, connected between said balun transformer and said communications media, for passing said broadband signals to said media and inhibiting the transmission of said baseband signals to said balun transformer.

33. The communication system defined in claim 29, wherein said communications media comprise two twisted pair wires for bi-directional transmission, wherein said circuit means further includes high-pass coupling means, connected between said balun transformer and each of said twisted pair wires, for passing said broadband signals between said wires and said balun transformer and inhibiting the transmission of said baseband signals to said balun transformer.

34. The communication system defined in claim 32, wherein said circuit means further includes low-pass coupling means, connected between said data signal port and said communication media, for passing said baseband signals and inhibiting the transmission of broadband signals to said data signal port.

35. The communication system defined in claim 33, wherein said circuit means further includes low-pass coupling means, connected between said data signal port and each of said twisted pair wires, for passing said baseband signals between data signal port and said wires and inhibiting the transmission of said broadband signals to said data signal port.

36. The communication system defined in claim 34, wherein said low-pass coupling means comprise a pair of first wires arranged in parallel and connected between said data signal port and said communications media, and wherein said high-pass coupling means include at least one second wire arranged in parallel with said first wires and connected at one end to said balun transformer.

37. The communication system defined in claim 35, wherein said low-pass coupling means comprise two pair of first wires arranged in parallel and connected between said data signal port and a respective set of said twisted pair wires, and wherein said high-pass coupling means include at least one second wire arranged in parallel with each pair of said first wires and connected at one end to said balun transformer.

38. The communication system defined in claim 36, wherein said pair of first wires are substantially $\lambda/4$ in length and said second wire is substantially $\lambda/8$ in length, where $\lambda$ is the wavelength of propogation at a frequency of said broadband signals, said first and said second wires having a common point of termination at one end.

39. The communication system defined in claim 37, wherein said two pair of first wires are substantially $\lambda/4$ in length and said second wires are substantially $\lambda/8$ in length, where $\lambda$ is the wavelength of propogation at a frequency of said broadband signals, each of said pair of first wires and the respective, associated one of said second wires having a common point of termination at one end.

40. The communication system defined in claim 38, wherein said first and second wires are wound together on a spool which is electrically and magnetically transparent.

41. The communication system defined in claim 39, wherein each pair of said first wires and their respective, associated second wires are wound together on a spool is electrically and magnetically transparent.

42. The communication system defined in claim 40, wherein said spool is made of plastic.

43. The communication system defined in claim 41, wherein said spool is made of plastic.

44. A three-port network for broadband and baseband signals, said network comprising:

(a) a first port for passing both broadband and baseband signals;
(b) a second port for passing broadband signals;
(c) a third port for passing baseband signals;
(d) first coupling means comprising a pair of first wires arranged in parallel and connected between said first port and said third port; and
(e) second coupling means comprising at least one second wire arranged in parallel with said pair of first wires and connected at one end to said second port,
wherein said first coupling means provides inductive, low pass coupling between said third port and said first port; and wherein said second coupling means provides capacitive, high pass coupling between said second port and said first port.

45. The communication system defined in claim 44, wherein said first coupling means comprise two pair of first wires arranged in parallel and connected between said first port and said third port, and wherein said second coupling means include at least one second wire arranged in parallel with each pair of said first wires and connected at one end to said second port.

46. The communication system defined in claim 44, wherein said pair of first wires are substantially $\lambda/4$ in length and said second wire is substantially $\lambda/8$ in length, where $\lambda$ is the wavelength of propogation at a frequency of said broadband signals, said first and said second wires having a common point of termination at one end.

47. The communication system defined in claim 45, wherein said two pair of first wires are substantially $\lambda/4$ in length and said second wires are substantially $\lambda/8$ in length, where $\lambda$ is the wavelength of propogation at a frequency of said broadband signals, each of said pair of first wires and the respective, associated one of said second wires having a common point of termination at one end.

48. The communication system defined in claim 44, wherein said first and second wires are wound together on a spool which is electrically and magnetically transparent.

49. The communication system defined in claim 45, wherein each pair of said first wires and their respective, associated second wires are wound together on a spool which is electrically and magnetically transparent.

50. The communication system defined in claim 48, wherein said spool is made of plastic.

51. The communication system defined in claim 49, wherein said spool is made of plastic.

* * * * *